US007073714B2

(12) United States Patent
Namaky et al.

(10) Patent No.: US 7,073,714 B2
(45) Date of Patent: Jul. 11, 2006

(54) CODE READER DISPLAY

(75) Inventors: Hamid Namaky, South Russell, OH (US); Robert A. Roberts, South Euclid, OH (US); Matthew H. Koran, Strongsville, OH (US)

(73) Assignee: SPX Corporation, Charlotte, NC (US)

(*) Notice: Subject to any disclaimer, the term of this patent is extended or adjusted under 35 U.S.C. 154(b) by 201 days.

(21) Appl. No.: 10/410,899

(22) Filed: Apr. 10, 2003

(65) Prior Publication Data

US 2004/0016804 A1 Jan. 29, 2004

Related U.S. Application Data

(60) Provisional application No. 60/371,786, filed on Apr. 11, 2002.

(51) Int. Cl.
*G06K 7/10* (2006.01)

(52) U.S. Cl. .......................... 235/462.15; 235/462.45; 235/462.46; 235/472.01; 235/472.02

(58) Field of Classification Search .......... 235/462.15, 235/462.45, 462.46, 472.01, 472.02; 701/29–33
See application file for complete search history.

(56) References Cited

U.S. PATENT DOCUMENTS

| | | | | | |
|---|---|---|---|---|---|
| D263,808 | S | | 4/1982 | Tanaka | |
| 4,354,260 | A | * | 10/1982 | Planzo | 368/10 |
| D269,165 | S | | 5/1983 | Driscoll | |
| D271,950 | S | | 12/1983 | Moore | |
| D276,844 | S | | 12/1984 | Eaton | |
| D289,621 | S | | 5/1987 | Tanaka et al. | |
| D290,097 | S | | 6/1987 | Baumann et al. | |
| 4,884,033 | A | * | 11/1989 | McConchie, Sr. | 324/503 |
| 4,996,643 | A | * | 2/1991 | Sakamoto et al. | 701/32 |
| 5,003,476 | A | * | 3/1991 | Abe | 701/33 |
| 5,003,477 | A | * | 3/1991 | Abe et al. | 701/33 |
| 5,003,478 | A | * | 3/1991 | Kobayashi et al. | 701/32 |
| 5,003,479 | A | * | 3/1991 | Kobayashi et al. | 701/33 |
| 5,005,129 | A | * | 4/1991 | Abe et al. | 701/31 |
| 5,065,360 | A | * | 11/1991 | Kelly | 708/142 |
| D323,129 | S | * | 1/1992 | Dulaney et al. | D10/125 |
| 5,228,122 | A | * | 7/1993 | Cahn et al. | 715/744 |
| 5,280,223 | A | * | 1/1994 | Grabowski et al. | 318/139 |
| D346,759 | S | | 5/1994 | Job et al. | |
| D368,493 | S | | 4/1996 | Boes et al. | |
| 5,541,840 | A | * | 7/1996 | Gurne et al. | 701/33 |
| 5,651,619 | A | * | 7/1997 | Nunokawa et al. | 400/83 |
| 5,758,300 | A | * | 5/1998 | Abe | 455/424 |
| 5,884,202 | A | * | 3/1999 | Arjomand | 701/29 |
| 5,916,286 | A | * | 6/1999 | Seashore et al. | 701/29 |
| 5,993,743 | A | * | 11/1999 | Nordman et al. | 422/94 |
| D418,826 | S | | 1/2000 | Pavely et al. | |
| D422,545 | S | | 4/2000 | Palalau et al. | |
| 6,052,070 | A | * | 4/2000 | Kivela et al. | 341/22 |
| D428,397 | S | | 7/2000 | Palalau et al. | |
| 6,181,992 | B1 | * | 1/2001 | Gurne et al. | 701/29 |
| D445,745 | S | | 7/2001 | Norman | |
| 6,259,421 | B1 | * | 7/2001 | Yokota et al. | 345/33 |
| D447,435 | S | | 9/2001 | Thomas | |

(Continued)

*Primary Examiner*—Uyen-Chau N. Le
(74) *Attorney, Agent, or Firm*—Baker & Hostetler LLP

(57) ABSTRACT

An improved code reader for reading and displaying OBD II diagnostic codes. The code reader displays textual diagnosis descriptions corresponding to diagnostic codes. The code reader can display both an OBD II code and the textual diagnosis description corresponding to a selected OBD II code by using multiple display rows for the display. The improved code reader also uses an improved user interface.

33 Claims, 13 Drawing Sheets

U.S. PATENT DOCUMENTS

| | | | | |
|---|---|---|---|---|
| RE37,652 | E * | 4/2002 | Kelly | 710/65 |
| 6,459,969 | B1 * | 10/2002 | Bates et al. | 701/29 |
| 6,587,768 | B1 * | 7/2003 | Chene et al. | 701/33 |
| 6,661,919 | B1 * | 12/2003 | Nicholson et al. | 382/173 |
| 6,685,093 | B1 * | 2/2004 | Challa et al. | 235/462.46 |
| 6,687,584 | B1 * | 2/2004 | Andreasen et al. | 701/29 |
| 6,693,367 | B1 * | 2/2004 | Schmeisser et al. | 307/9.1 |

* cited by examiner

CODE READER DISPLAY

CROSS REFERENCE TO RELATED APPLICATION

This application claims the benefit under 35 U.S.C. § 119(e) of U.S. Provisional Application 60/371,786, filed Apr. 11, 2002, titled IMPROVED CODE READER DISPLAY, which application is hereby incorporated by reference in its entirety.

FIELD OF THE INVENTION

The present invention relates generally to the field of electronic testing devices, and more specifically to a code reader having an improved display and an improved user interface.

BACKGROUND OF THE INVENTION

Modern vehicles typically have a vehicle diagnostic system, generally having one or more separate computer control modules. Examples of such computer control modules (also known as just "modules") are: a powertrain control module (PCM), an engine control module (ECM), a transmission control module (TCM), an ABS control module, and an air bag control module.

"Off-board devices," such as scan tools, are known in the art and are testing devices that interface with vehicle diagnostic systems to, e.g., access, display, and/or print vehicle diagnostic information. OBD II (On-Board Diagnostics version II) Scan Tools are one commonly known type of scan tool and are governed by a number of standards, e.g., SAE J1978 Rev. 1998-02 and SAE J1979 Rev. 1997-09. Scan tools are relatively expensive diagnostic devices that have a relatively large number of features and are typically marketed to professional automobile mechanics and service stations. Scan tools are generally considered to be beyond the means of most automobile hobbyists and the ordinary individual interested in performing simple maintenance or service of a few vehicles, such as a family "fleet" of vehicles.

There are different types of scan tools. An "OBD II Scan Tool" complies with the above-identified specifications. By contrast, a "Manufacturer-Specific Scan Tool" is a scan tool that accesses and displays proprietary manufacturer-specific data (and possibly also additionally accesses and displays OBD II data). Examples include Device Controls on General Motors, On-Demand Tests in Ford, Actuator Tests, Sensor Tests, Interrogator, Read Temporary Codes in Chrysler. In general, air bag data, ABS data, cruise control data, and climate control data are also considered to be proprietary manufacturer-specific data and are typically included only in Manufacturer-Specific Scan Tools.

Another "off-board device" that is a low-cost alternative to the scan tool is a "code reader." In 1998 Actron Manufacturing Corp., the assignee of the present invention, pioneered the first OBD II code reader. In contrast with a scan tool, a code reader is a relatively basic "off-board device" that links with one or more computer modules in a vehicle diagnostic system via a vehicle computer network, reads any diagnostic trouble codes (also referred to as just "diagnostic codes" herein) asserted by those vehicle diagnostic systems, and displays any diagnostic codes on a display. Typical code readers do not perform the following major functions that are performed by typical scan tools: "View Data," also known as "Live Data," "Data," and "Data Test, DTC" (viewing and displaying in real-time live, changing data from a plurality of module sensors), display of textual diagnosis descriptions corresponding to the various diagnostic codes, recording and playback of data, device control (manually controlling modules for diagnostic purposes), and reading and displaying vehicle information from the vehicle's computer (e.g., VIN information, controller calibration identification number, etc.). Code readers are typically marketed to automobile hobbyists and non-professionals who are merely curious about what codes the various vehicle diagnostic systems have stored in their memories.

As used here, an "OBD II Scan Tool" is significantly different from a manufacturer-specific "scan tool." A given off-board device might be a scan tool but not an OBD II Scan Tool, because it does not meet applicable specifications. Also, as used herein, a "scan tool" is significantly different from a "code reader." The "live data" function, i.e., the ability to view and display real-time live data from a plurality of various different sensors (and other information derived from sensor data) is a very important feature of scan tools, and can be used to distinguish a scan tool from a code reader. Thus, as used herein, the term "scan tool" means an off-board device that (a) obtains and displays vehicle diagnostic trouble codes (preferably but not necessarily OBD II DTCs) from a vehicle diagnostic system and (b) obtains and displays in real-time live, changing vehicle diagnostic data from a plurality of modules representing either (i) sensor data or (ii) information derived from sensor data. Similarly, as used herein, the term "code reader" means an off-board device that (a) does obtain and display vehicle diagnostic trouble codes (preferably but not necessarily OBD II DTCs) from a vehicle diagnostic system and (b) does not obtain and display in real-time live, changing vehicle diagnostic data from a plurality of modules representing either (i) sensor data or (ii) information derived from sensor data. By way of example, but not of limitation, examples of sensor data and information derived from sensor data are (1) calculated load value (e.g., SAE J1979 9/97 PID 04H), (2) engine coolant temperature (e.g., PID 05H), (3) engine RPM (e.g., PID 0CH), (4) absolute throttle position (e.g., PID 11H), (5) intake air temperature (PID 0FH), and (6) oxygen sensor data (e.g., at least one of PID 14H through 1BH). The reading and display of malfunction indicator light (MIL) status, even if obtained and displayed live, in real-time, would not be considered to be "live data" and would not, by itself, make an off-board device be considered to be a scan tool, because illumination of MIL indicates that there is a code available in on of the modules and does not represent either (i) sensor data or (ii) information derived from sensor data. By way of further example, on the one hand an off-board device that obtains and displays vehicle diagnostic trouble codes from a vehicle diagnostic system and that obtains and displays in real-time live, changing vehicle diagnostic data representing one or more of the six above-listed parameters (or other data representing sensor data or information derived from sensor data) is a scan tool. On the other hand, an off-board device that obtains and displays vehicle diagnostic trouble codes from a vehicle diagnostic system and that does not obtain and display in real-time live, changing vehicle diagnostic data representing one or more of the six above-listed parameters (or other data representing sensor data or information derived from sensor data) is a code reader and not a scan tool, even if it displays MIL status.

One typically uses a code reader when a vehicle malfunction indicator light ("MIL") (e.g., the "Check Engine" light) on the dashboard of a vehicle is illuminated. In response to the illumination of such a light, e.g., a "Check Engine" display, the user connects an code reader to the vehicle diagnostic connector, presses a first button (e.g., a READ or LINK button) or activates a menu-driven function, which causes the code reader to (i) establish communications with the various modules in a vehicle diagnostic system using a communications protocol, (ii) read any codes which are stored in the vehicle's computer modules in the vehicle diagnostic system, and (iii) display one or more vehicle diagnostic codes via a display. The user then uses a reference manual to determine the nature of the diagnosis corresponding to each diagnostic code.

For example, the ACTRON® CP9035 code reader, generally recognized as the first OBDII code reader, has three buttons, a READ button, an ERASE button, and an arrow button, four LEDs, labeled "Power Train," "Body," "Chassis," and "Uart," and a four-digit seven-segment LED numeric display. When an indicator light is illuminated, or just to see if any diagnostic codes are available, a user will connect the connector of the code reader to the connector for the vehicle diagnostic system network. The CP9035 code reader is powered by the vehicle being tested. The user initiates the link and read process by pressing the READ button, which causes the CP9035 to (i) establish communications with vehicle computer modules in the vehicle diagnostic system using a communications protocol, (ii) read any codes which are stored in vehicles computer modules in the vehicle diagnostic system, and (iii) display the first vehicle diagnostic code via an LED and the numeric display. The other codes are displayed in turn by pressing the arrow button. The codes are erased by pressing the ERASE button.

Although scan tools display OBD II and/or manufacturer-specific textual diagnosis descriptions, with the much simpler code readers, the user must manually determine the nature of the codes. For example, if five codes are displayed 0743, 0443, 0118, 0113, and 1490, all with the "Power Train" LED illuminated, then the user would understand that the CP9035 code reader had read the following codes from the vehicle diagnostic system: P0743, P0443, P0118, P0113, and P1490. In response, the user would open the manual, and read the corresponding descriptions. Relevant portions of the manual read:

| | |
|---|---|
| P0113 | Intake Air Temperature Circuit High Point |
| | . . . |
| P0118 | Engine Coolant Temperature Circuit High Input |
| | . . . |
| P0443 | Evaporative Emission Control System Purge Control Valve Circuit Malfunction |
| | . . . |
| P0743 | Torque Converter Clutch Circuit Electrical |
| | . . . |
| P1490 | Low Speed Fan Control Relay Circuit |

allowing the user to manually determine the respective diagnosis corresponding to each diagnostic code. This process of manually reading the OBD II and/or manufacturer-specific textual diagnosis descriptions can be time-consuming and, of course, is subject to human error.

Generally, displays on code readers and scan tools provide either a display matrix having an array of n-by-m (e.g., 2-by-20 or 2-by-16) numeric or alphanumeric character displays, or one or more rows of numeric and/or alphanumeric character displays along with a plurality of dedicated icons. For example, the ACTRON® CP9035 code reader has a 1-by-4 LED numeric display. As another example, the ACTRON® CP9110 scan tool has a 4-by-20 LCD alphanumeric display. As yet another example, the INNOVA 3100 code reader by Equus Products, Inc., has a 1-by-5 LCD alphanumeric display, a 1-by-2 LCD numeric display, and a plurality of dedicated icons, including "MONITOR," "RUN," "DONE," "PENDING," "MIL," "M," "F," "CC," "C," "HC," "EV," "2A," "AC," ",O" "OH," "E," "±," left/right arrows, a vehicle icon, and a computer icon. Although helpful for providing a number of discreet pieces of information, such icons are fixed and subject to confusion and also subject to possible obsolescence if the underlying information represented by the icons changes.

User interfaces typically have either a very simple several-button interface with dedicated buttons or a menu-driven interface. As an example of the simple interface with dedicated buttons; the ACTRON® CP9035 code reader has a READ button, an ERASE button, and a combined up arrow/down arrow button. As an example of the menu-driven interface, the KAL EQUIP KM9615 OBD II scan tool has a "BACK" button, a "?" button, an UP ARROW button, a DOWN ARROW button, an "ENTER" button, and a LEFT ARROW/RIGHT ARROW button. Although giving the user many more options, a menu-driven interface is certainly not as easy to use as the several-button interface with dedicated buttons for simple functions and, because of the numerous options and menu layers, a menu-driven interface can actually be confusing to some users.

Thus, although code readers provide an inexpensive way to permit one to read OBD II and/or manufacturer-specific codes from vehicle diagnostic systems, there is a need for an improved code reader.

SUMMARY OF THE INVENTION

The present invention is directed toward an improved low-cost code reader having an improved display in which textual diagnosis descriptions corresponding to diagnostic codes (preferably but not necessarily OBD II diagnostic trouble codes) are displayed to a user.

The present invention is also directed to an improved code reader having an improved display in which the display has at least two rows of display characters available for displaying information, with one row having display characters that are significantly larger than the other row(s). The at least two rows of display characters are preferably about the same length and the larger display characters are preferably about twice as large as the smaller display characters. Such a display will permit, for example, the row of larger characters to display a diagnostic code while the row(s) of smaller display characters displays textual diagnosis descriptions corresponding to the diagnostic code.

The present invention is further directed to an improved code reader having an improved user interface enabling the user to use either a simple dedicated-button interface or a menu-driven interface, preferably with some of the buttons being used in either option.

It is therefore an advantage of the present invention to provide an improved code reader that displays a several character diagnostic code on a larger display along with a textual diagnosis description corresponding to the diagnostic code on a smaller display.

It is another advantage of the present invention to provide an improved code reader that has a display that has at least two rows of display characters available for displaying information, with one row having display characters that are significantly larger than (and preferably about twice as large as) the other row(s).

It is still another advantage of the present invention to provide an improved code reader that has either (a) a 1-by-n display aligned with and approximately the same length as a 1-by-2n display or (b) a 1-by-n display aligned with and approximately the same length as a 2-by-2n display.

It is a further advantage of the present invention to provide a display having a row of larger display characters to emulate icons along with at least one row of smaller display characters.

It is yet another advantage of the present invention to provide a user-interface for a code reader that is simple enough to be picked up and used by a user having experience with simple dedicated-button code reader interfaces, yet also gives a user the option of using a menu-driven interface with more options than the dedicated-button interface.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example the principles of this invention, wherein.

DETAILED DESCRIPTION OF THE INVENTION

Figure 1:
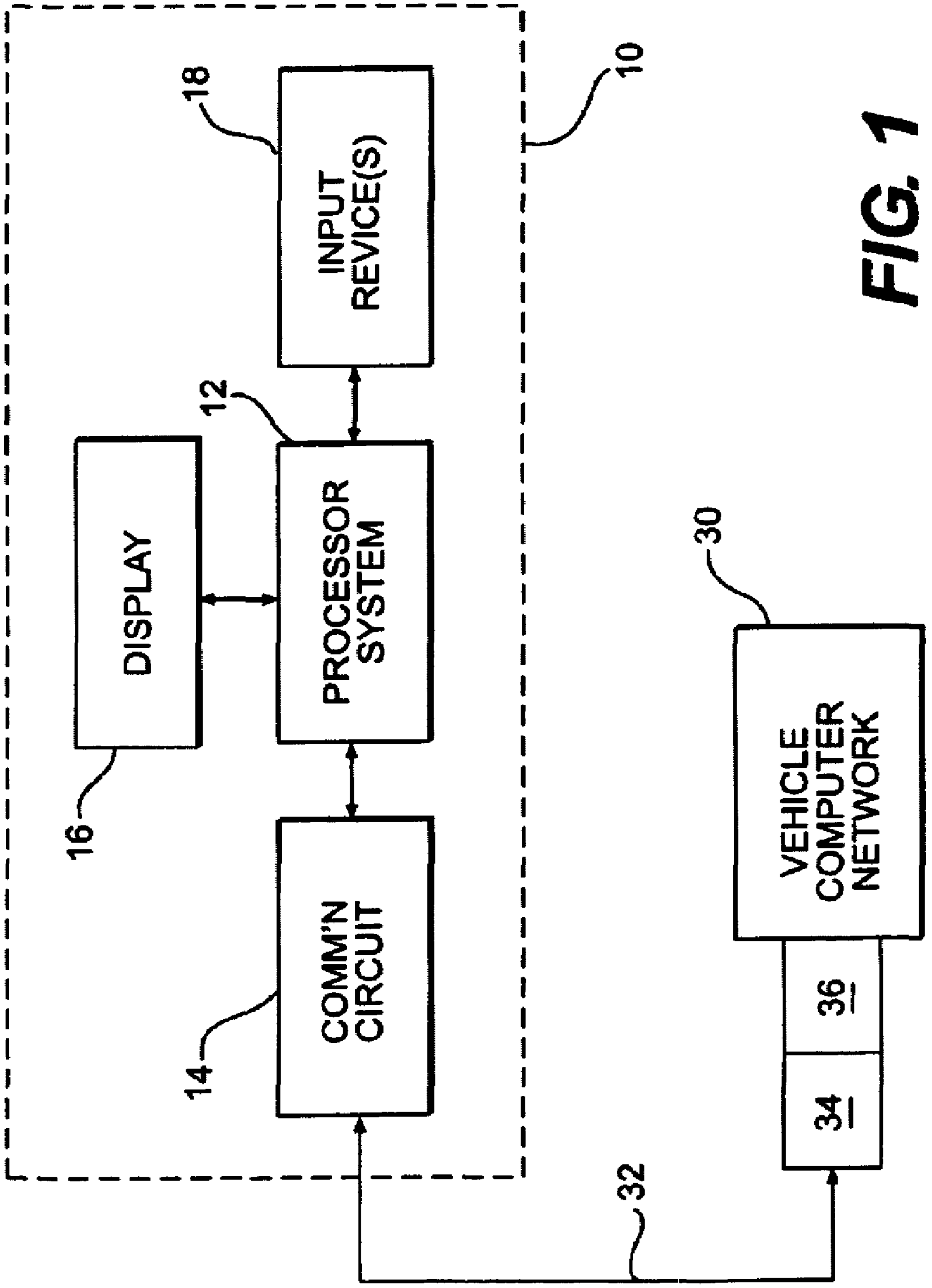
FIG. 1 is a high-level block diagram of a code reader according to the present invention.

FIG. 1 illustrates a high-level block diagram of both a typical code reader and a code reader 10 of the present invention. Such a code reader 10 includes a processor system 12 in circuit communication with a communication circuit 14, a display 16, and one or more input devices 18.

"Circuit communication" as used herein indicates a communicative relationship between devices. Direct electrical, electromagnetic, and optical connections and indirect electrical, electromagnetic, and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers, or even satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, e.g., a CPU, are in circuit communication. The term "preferably" as used herein is intended to mean preferably, but not necessarily.

The code reader 10 is placed in circuit communication with a source of a code having at least one alphanumeric character, for example, a vehicle computer network 30 having one or more interconnected computers ("modules" as discussed above) via a connection link carried by a communication cable 32. The connection cable 32 typically has a connector 34 affixed thereto that connects to a mating connector 36 in circuit communication with the vehicle computer network 30.

The processor circuit 12, also referred to herein as just processor 12, may be one of virtually any number of processor systems and/or stand-alone processors, such as microprocessors, microcontrollers, and digital signal processors, and has associated therewith, either internally therein or externally in circuit communication therewith, associated RAM, ROM, EPROM, EEPROM, clocks, decoders, memory controllers, and/or interrupt controllers, etc. (all not shown) known to those in the art to be needed to implement a processor circuit.

The communications circuit 14 typically generates one or more communications protocols with which the code reader 10 and the vehicle computer network 30 communicate with one-another. The communications circuit 14 can be implemented either in hardware, or in software, or in a combination of hardware and software. Communication circuit 14 preferably generates a communications link consistent with any one or more of the following protocols: SAE J1850 (VPM), SAE J1850 (PWM), ISO 9141-2, ISO 14230-4 ("Keyword 2000"), and Controller Area Network ("CAN") (ISO 15765-4). The present invention is not intended to be limited to any specific protocol, or even to electrical communications protocols. Other present and future protocols, such as fiber optic and wireless communications protocols, are also contemplated as being within the scope of the present invention.

The display 16 has at least a display circuit for communicating with the processor the display circuit having a display region for displaying one or more display characters.

The display region can be one or more of virtually any type of display, e.g., textual displays (such as n character by m line LCD or plasma displays, etc.), binary displays (such as LEDs, lamps, etc.), graphical displays (such as LCD displays that can display text and bar graphs and the like), etc. That said, the display 16 of the present invention preferably but not necessarily has limited display capabilities, i.e., has fewer available character display locations than the information that is to be communicated at various points in time. For example, several ODB II textual diagnostic descriptions have more than 130 alphanumeric characters and the display of the present invention has significantly fewer alphanumeric display characters available for display of those textual diagnostic descriptions ("diagnoses"), e.g., a 1×16 LCD display having 16 display characters, a 1×20 LCD display having 20 display characters, a 2×16 LCD display having 32 display characters, or a 2×20 LCD display having 40 display characters. The input device(s) 18 are typically one or more buttons or keys or a keyboard, but may be one or more of virtually any type of input device, such as touch screens, etc. In addition, one or more optional additional storage devices (not shown) can be placed in circuit communication with the processor system 12 and can comprise, for example, cartridge memories (such as those containing EPROM, EEPROM, or Flash PROM memories), PC cards, stick memories (such as SONY brand MEMORY STICK packaged memory semiconductors), so-called floppy diskettes, etc.

The processor 12 typically executes a computer program stored in its RAM, ROM, Flash memory, and/or its EPROM (all not shown) and/or stored in any of the additional storage devices, if any, using data stored in any one or more of those memories. For example, the processor 12 may execute a computer program from an EEPROM (not shown) using data (e.g., OBD II diagnostic codes or textual descriptions of diagnostic codes) stored in a cartridge memory. In general, the computer program executed by the processor in typical code readers initializes the code reader and generates a user interface (e.g., using the input device(s) 18), through which a user causes the code reader to communicate with the vehicle computer network 30 to read certain data (diagnostic codes) from the vehicle computer network 30, format such read data, and display the formatted data on the display 16. At this high level, the code reader 10 according to the present invention works the same: the computer program executed by the processor 12 initializes the code reader 10 and generates a user interface (e.g., using the input device(s) 18), through which a user causes the code reader 10 to communicate with the vehicle computer network 30 to read certain data from the vehicle computer network 30, format such read data, and display the formatted data on the display 16. A fundamental difference in the present invention is how the code reader 10 of the present invention formats the data and displays the data. The known code readers merely display the alphanumeric diagnostic codes themselves. The code reader according to the present invention displays the alphanumeric diagnostic codes and also the textual diagnosis descriptions corresponding to the diagnostic codes.

Figure 2:
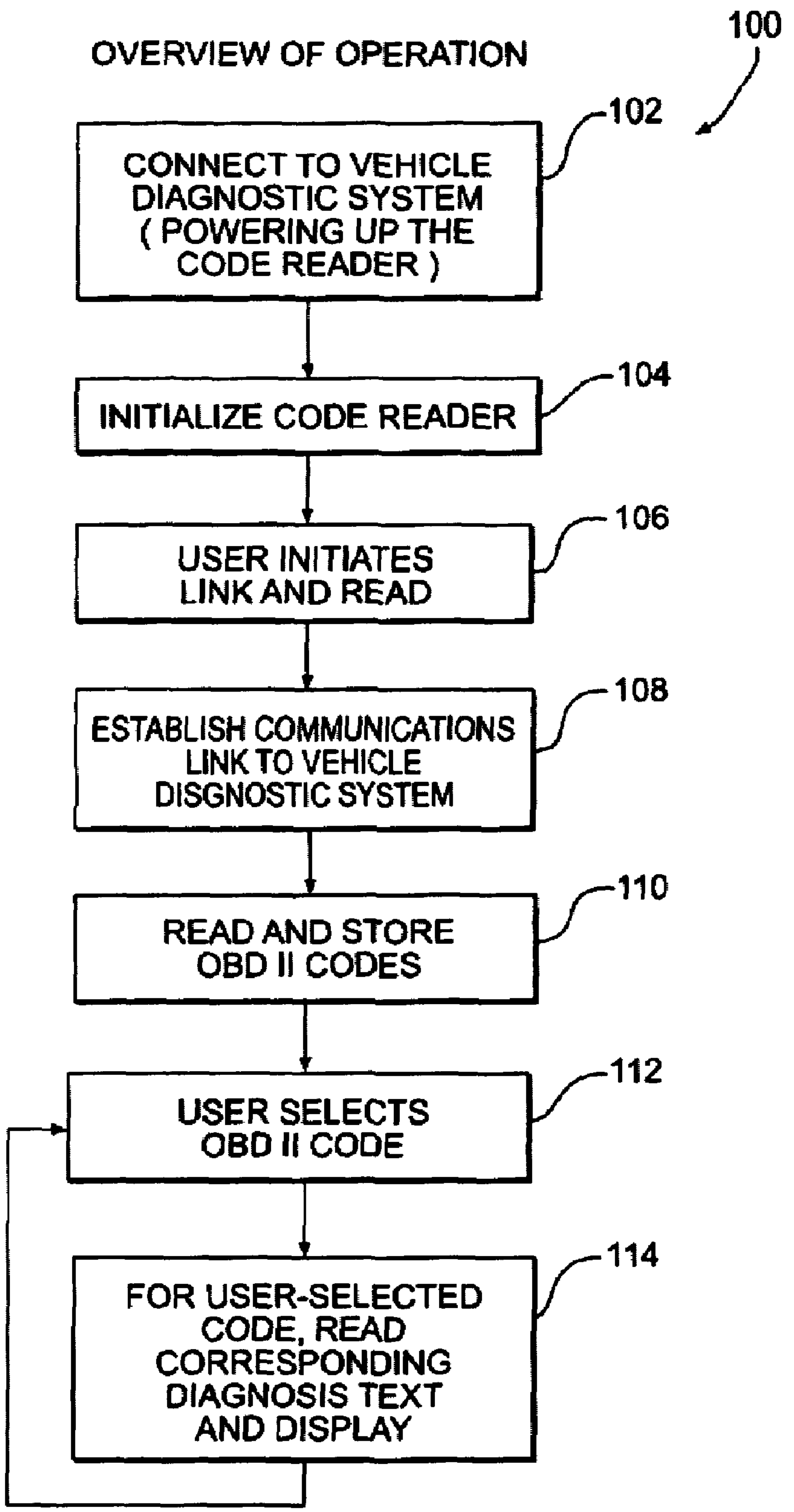
FIG. 2 is a high-level flow chart showing the operation of a code reader according to the present invention.

FIG. 2 is a high-level flow chart 100 showing an overview of the code executed by processor 12 in operation of the code reader 10. Of course, the code reader 10 must be connected to the vehicle computer network 30 via a suitable cable 32 or other communications medium, e.g., fiber optic or wireless medium. Thus, first, the code reader 10 is connected to the vehicle computer network 30, at step 102. This preferably provides power to the code reader 10 and begins execution of code, at step 104. In the alternative, the code reader 10 is connected to the vehicle computer network 30 and turned on. First, at step 104, the processor system initializes the code reader 10. The initialization of processor systems like processor system 12 and associated devices 14, 16, 18 is known to those in the art. Next, at 106, the processor waits for a user to initiate the code reading process via the user input device(s) 18, e.g., by the user actuating a READ button or LINK button (see, e.g., FIG. 13). In response, the processor 12 causes the communications circuit 14 to establish a communications link with the vehicle computer network 30, at 108. The communications link is preferably established and maintained using the processes disclosed in copending Application Ser. No. 60/295,318, filed on Jun. 1, 2001, and entitled "Scan Tool With Dropped Communications Detection and Recovery and Improved Protocol Selection," which is hereby incorporated by reference. If any OBD II modules are detected, at step 110, the processor 12 causes the communications circuit 14 to request data from the module(s), stores any data transmitted to the code reader 10 by the module(s), and displays via display 16 that one or more codes were retrieved. Next, at 112, the user selects an OBD II code for display. In response, the processor at 114 reads from a memory internal to the processor system 12 or reads from one or more optional additional storage devices (not shown) the textual diagnosis description corresponding to the selected OBD II code (or other diagnostic code) from a lookup table containing a plurality of textual diagnosis descriptions sorted by OBD II code (or other diagnostic code), and then the processor displays that text, either with or without the corresponding code, via the display 16. This display of textual diagnosis descriptions by a code reader is one important aspect of the present invention.

Figure 3:
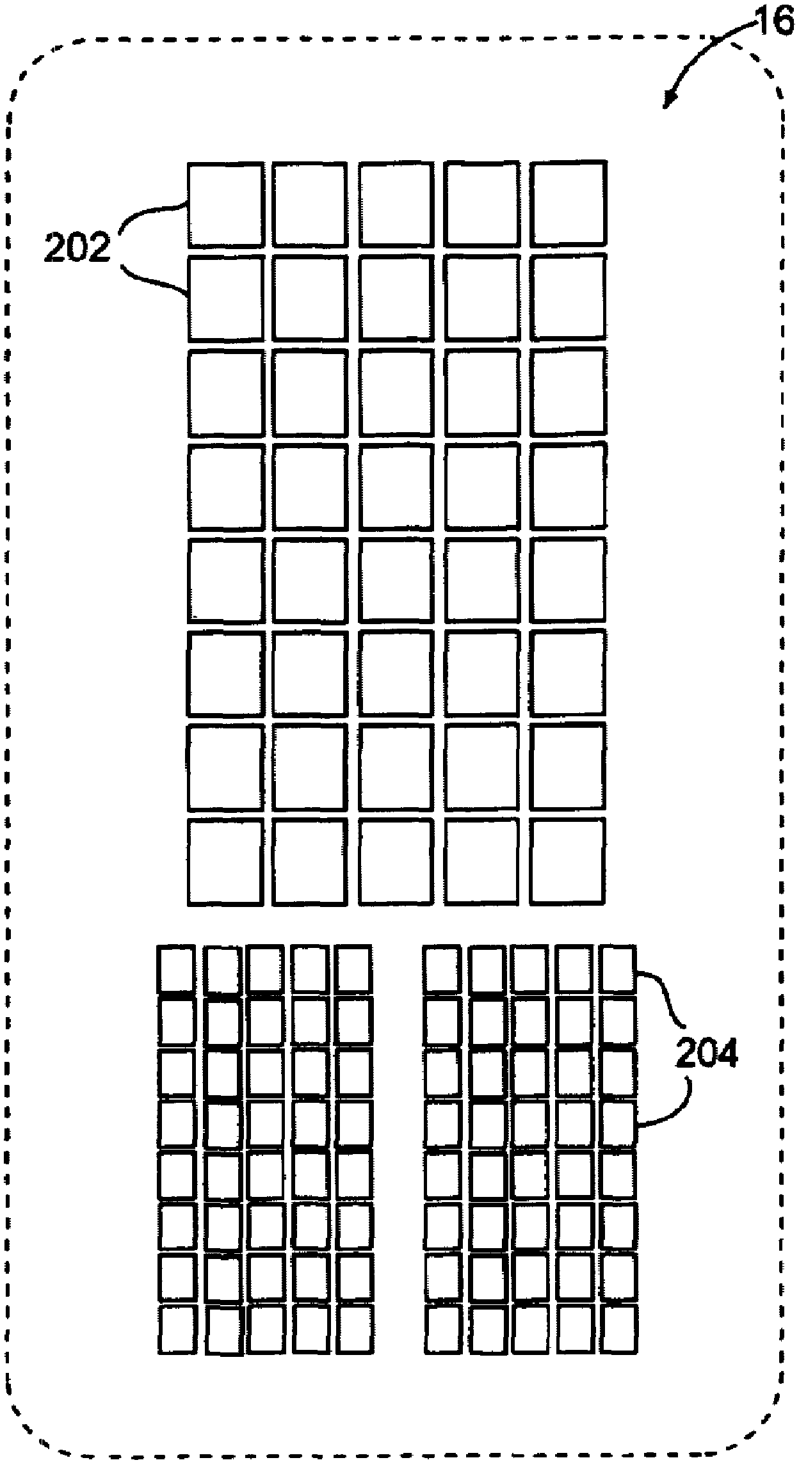
FIG. 3 is a representation of a character display configuration according to one embodiment of the present invention.

The display 16 of the present invention is preferably provided with display characters arranged in more than one row, all rows having approximately the same width, namely, about the width of the display. FIG. 3 illustrates one embodiment of such arrangement with large display characters 202 arranged as a first row of display characters and small display characters 204 arranged as a second row of display characters in which there is a single large display character 202 and two small display characters 204. Large display characters 202 are larger than small display characters 204 and preferably about twice as large as small display characters 204. Large display characters 202 and small display characters 204 may be of virtually any type of display characters, e.g., 7-segment numeric characters, other numeric characters, 11-segment alphanumeric characters, 5-by-8 matrix alphanumeric characters, other alphanumeric characters, etc., and may be of virtually any technology, e.g., LED, LCD, plasma display, active matrix displays, etc. It is to be understood that the term "display character" herein refers to a discrete display capable of displaying one or more of a plurality of different symbols (and thus is analogous to "digits" for numbers), including but not limited to English alphanumeric characters, and virtually any other language, such as Cyrillic characters, Arabic characters, Chinese, Japanese, or Korean characters, Hebrew characters, iconic characters (for example, icons corresponding to the "Power Train," "Body," "Chassis," and "Uart" system areas discussed above), symbols, graphical representations, and any other item that may be displayed. In one embodiment, as illustrated in FIG. 3, the large display characters 202 are LCD characters having a 5×8 pixel matrix with one large display character 202 across the width of the display 16 and the small display characters 204 are LCD characters having a 5×8 pixel matrix with two characters across the width of display 16.

All of the display characters 202, 204 are preferably driven by one or more identical driver chips, e.g., Samsung driver model number KS0066U (not shown) in circuit communication with the processor 12, which provides a very economical display (on the order of a few U.S. dollars).

Figure 4:
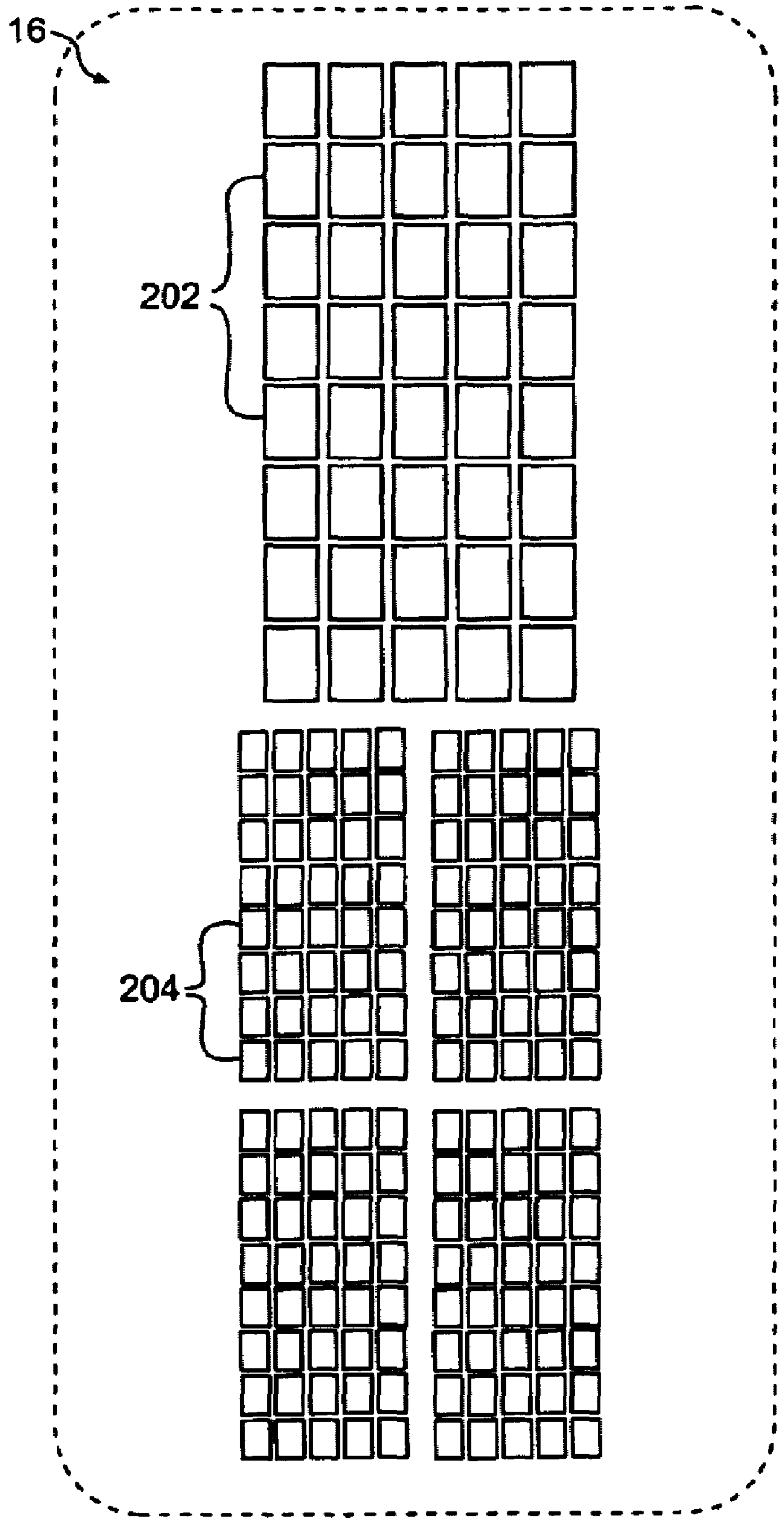
FIG. 4 is a representation of a character display configuration according to another embodiment of the present invention.
Figure 5:
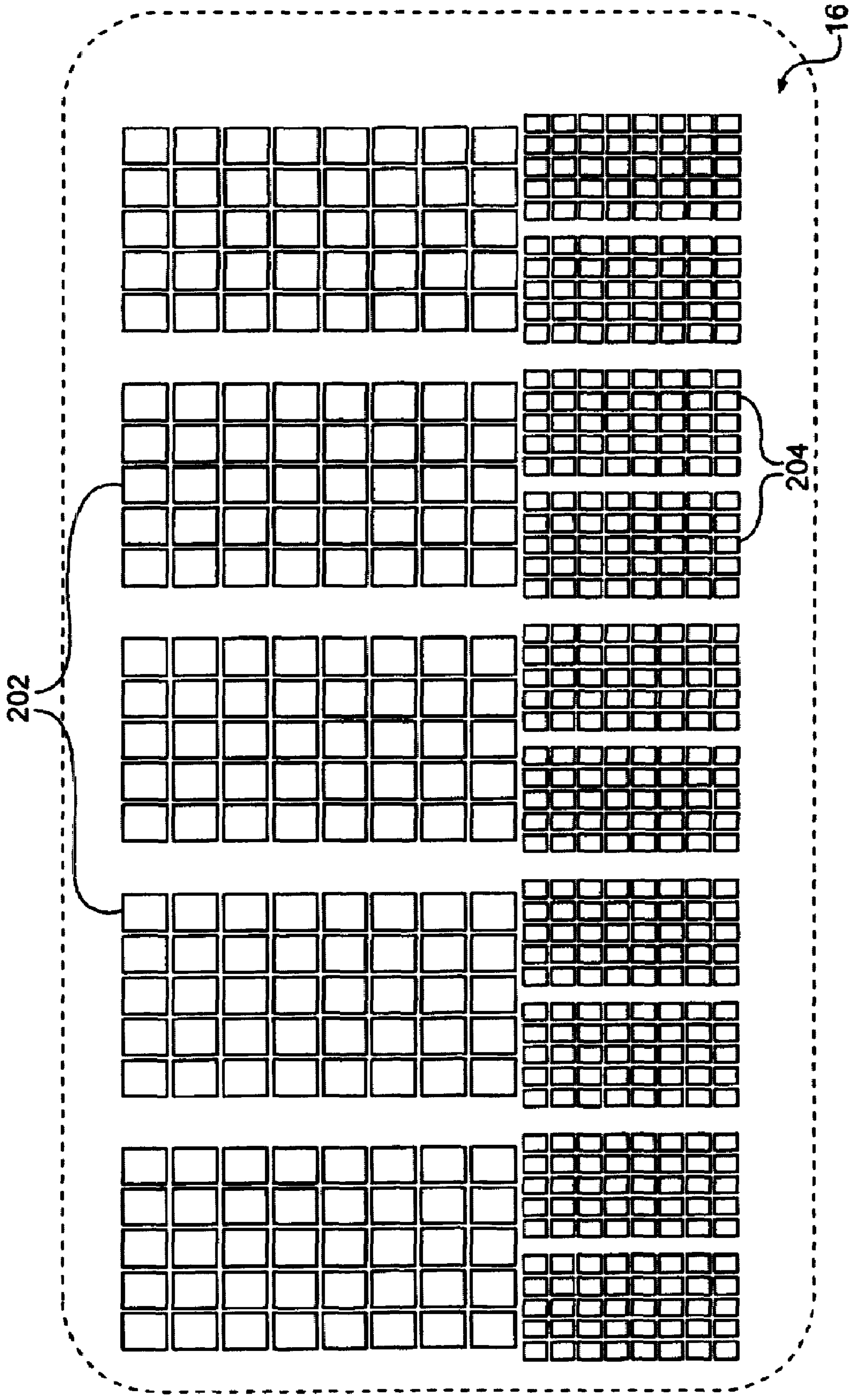
FIG. 5 is a representation of a character display configuration according to a further embodiment of the present invention.
Figure 6:
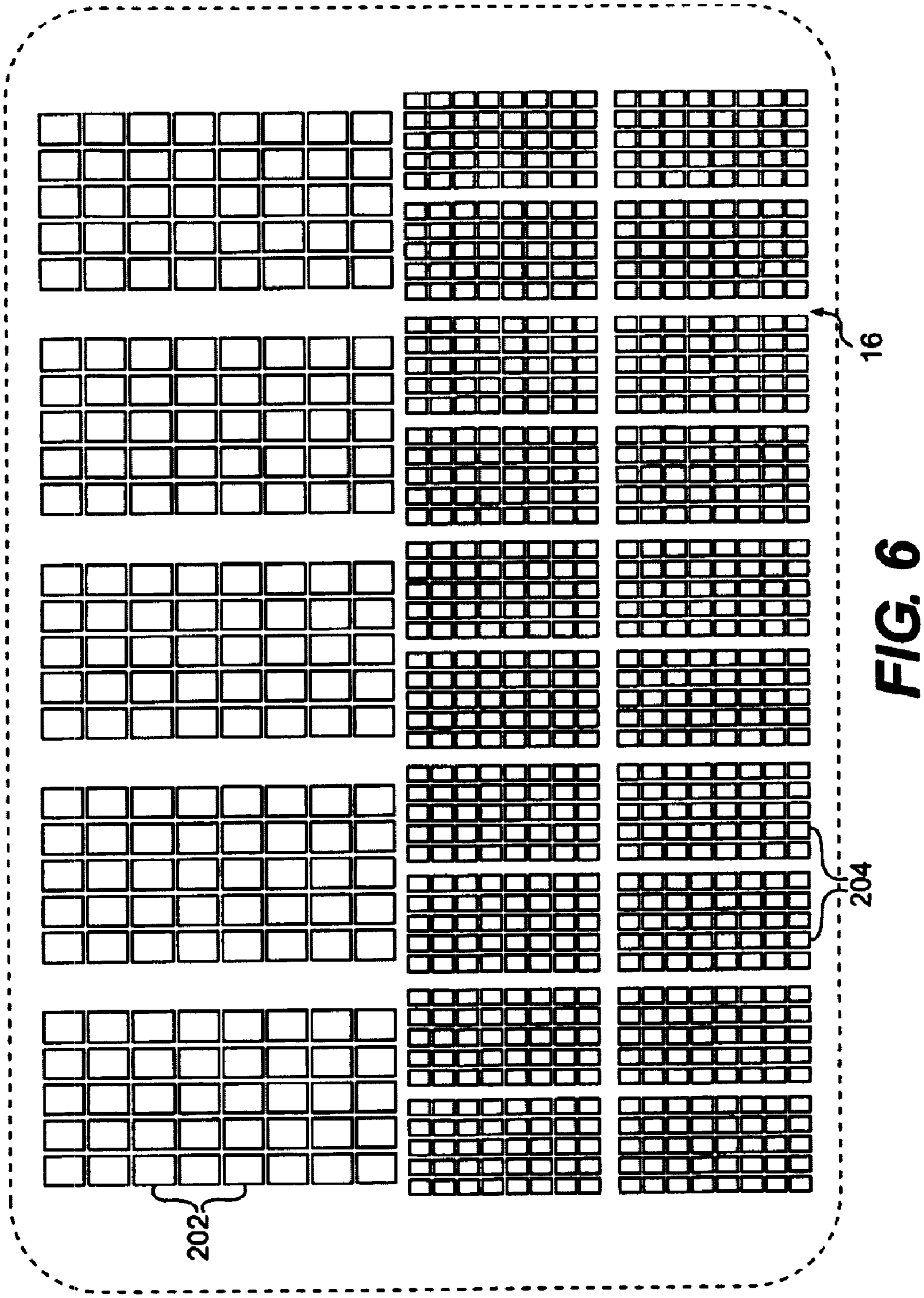
FIG. 6 is a representation of a character display configuration according to a further embodiment of the present invention.
Figure 7:
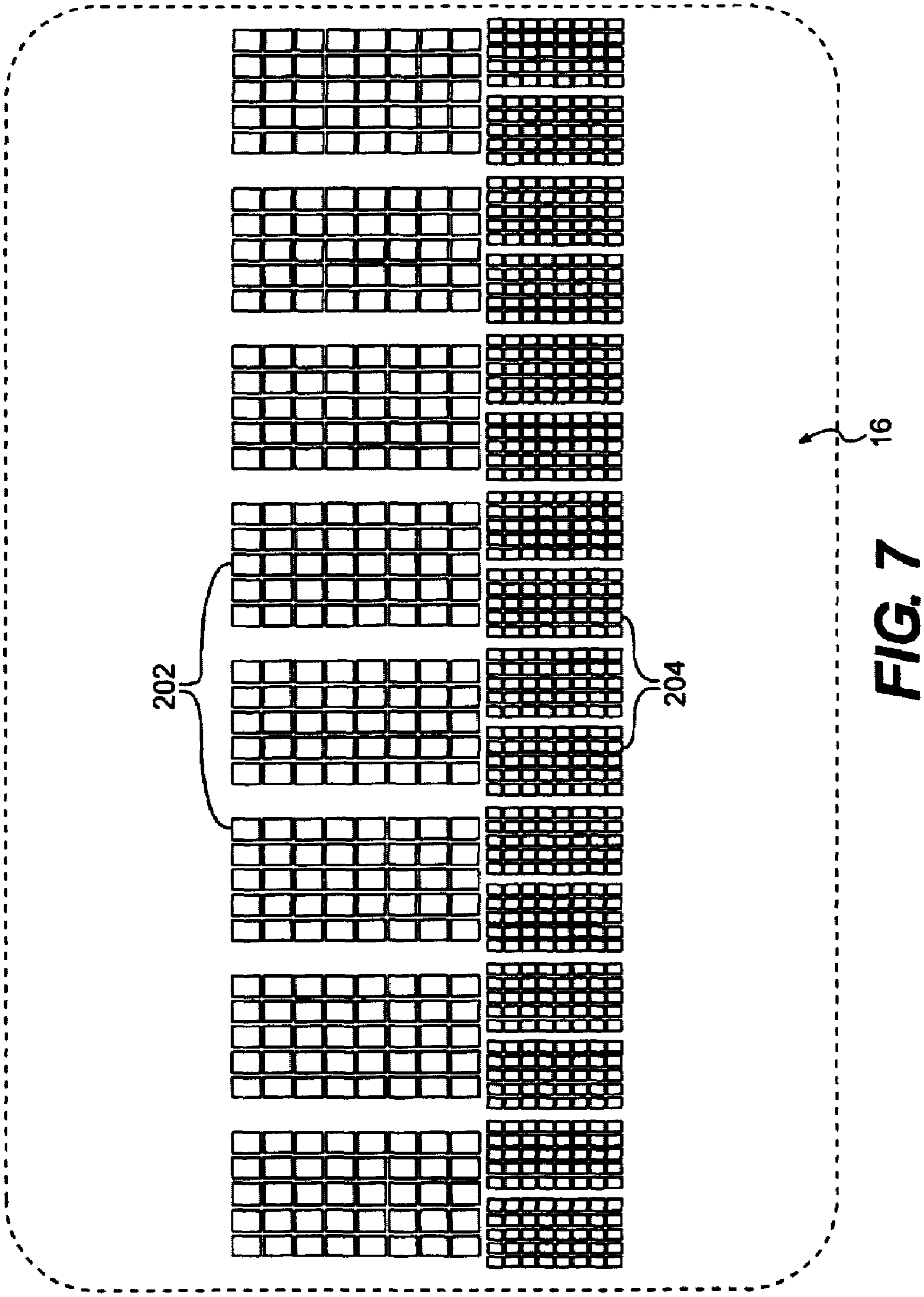
FIG. 7 is a representation of a character display configuration according to a further embodiment of the present invention.
Figure 8:
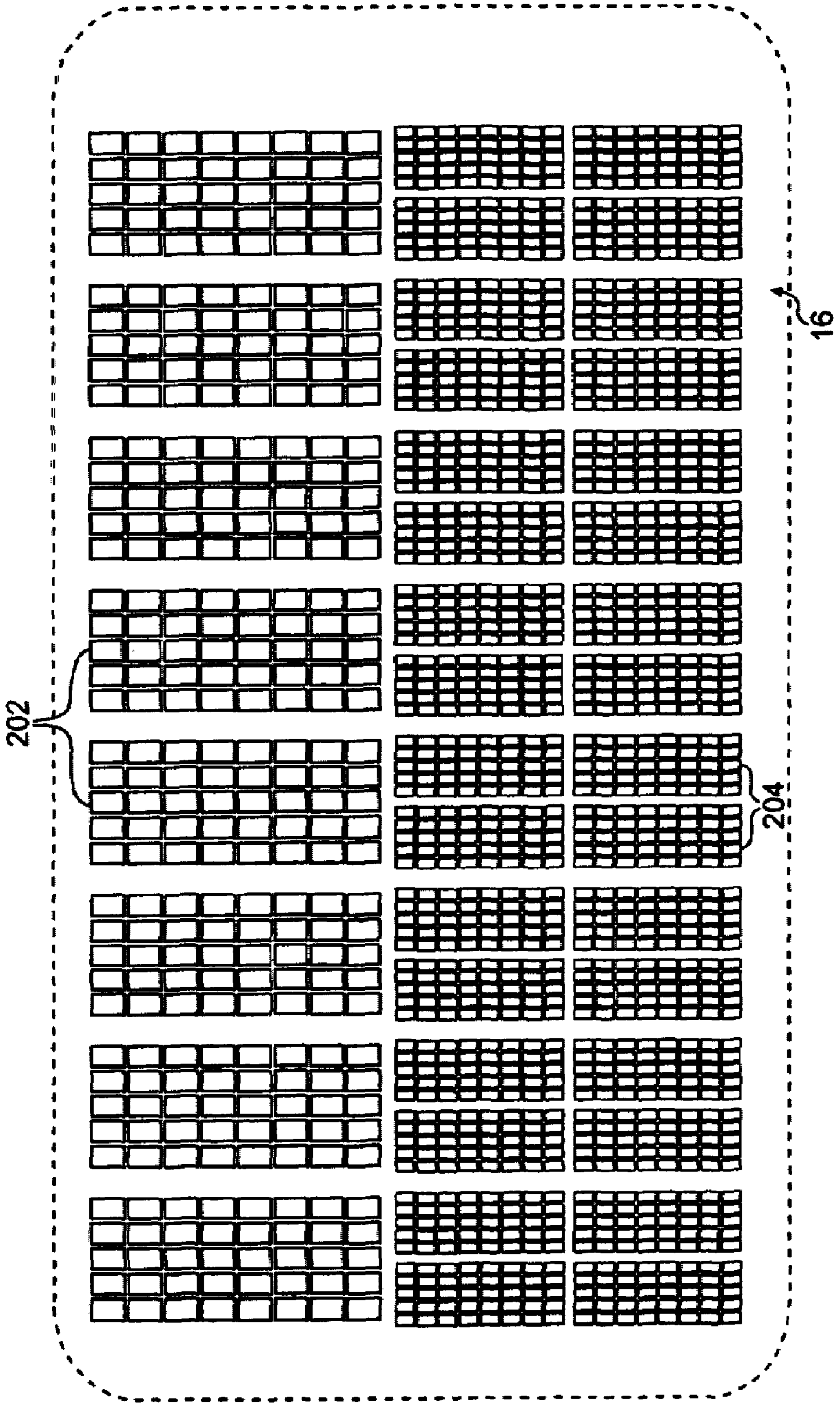
FIG. 8 is a representation of a character display configuration according to a further embodiment of the present invention.
Figure 9:
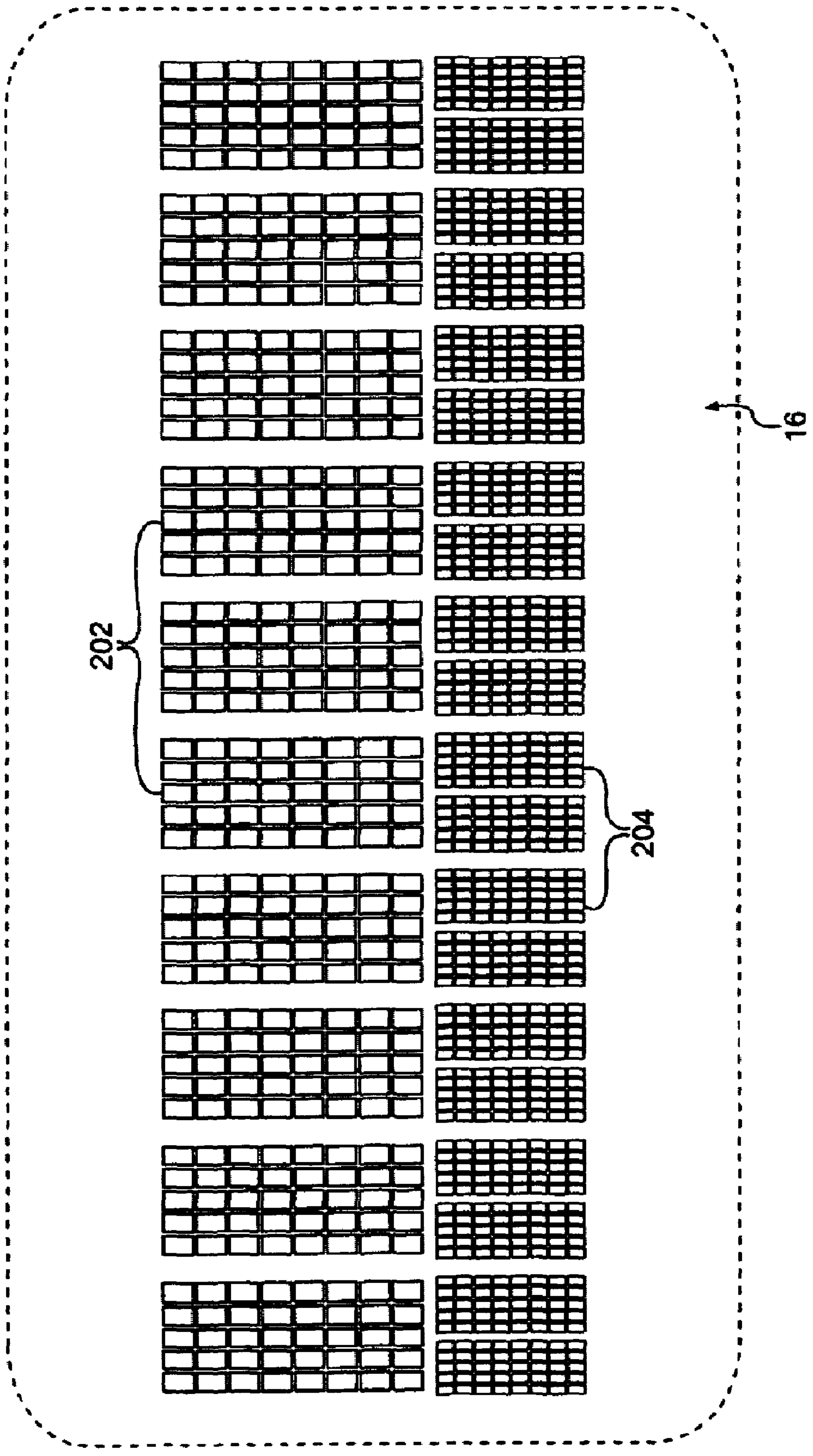
FIG. 9 is a representation of a character display configuration according to a further embodiment of the present invention.
Figure 10:
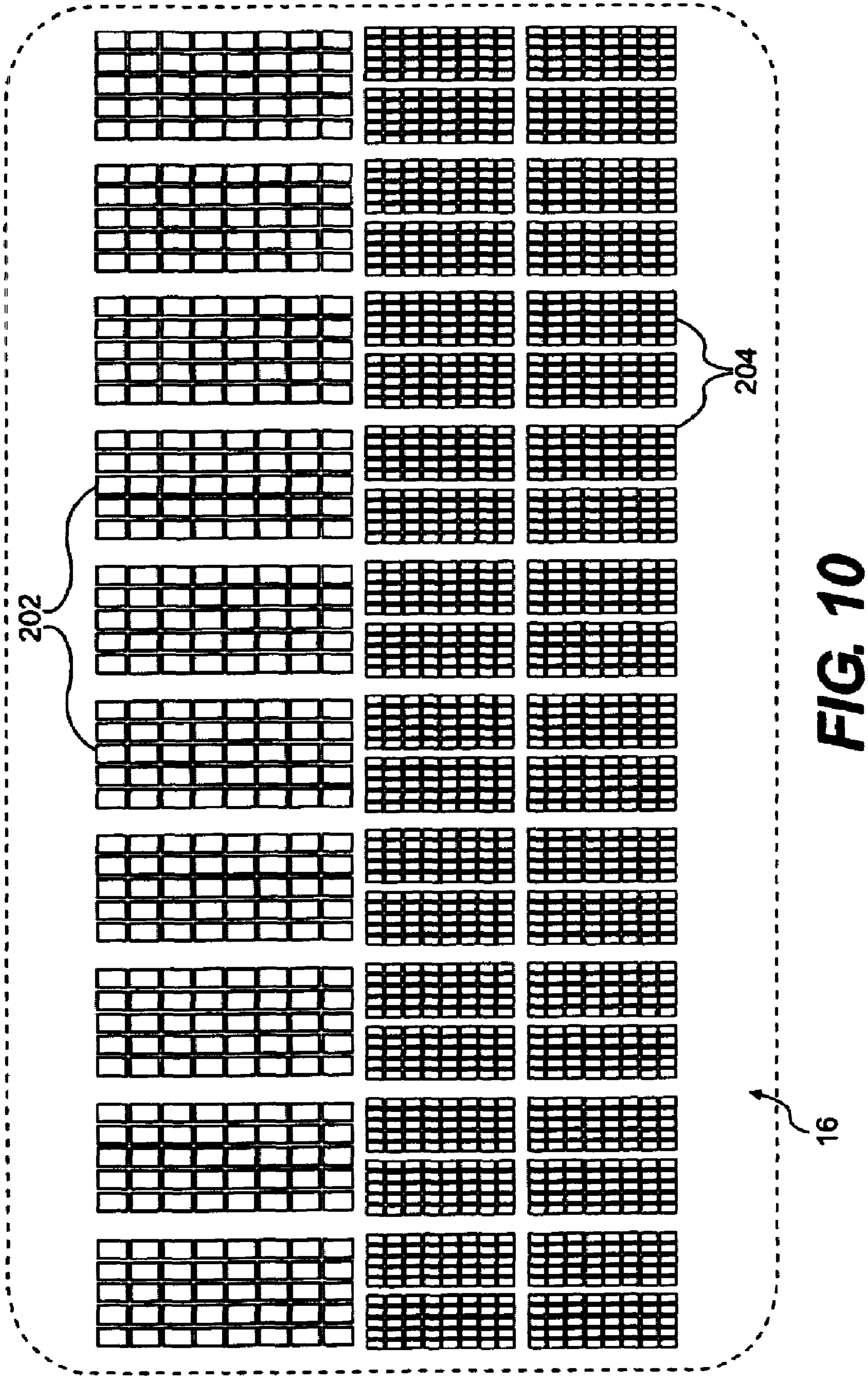
FIG. 10 is a representation of a character display configuration according to a further embodiment of the present invention.
Figure 11:
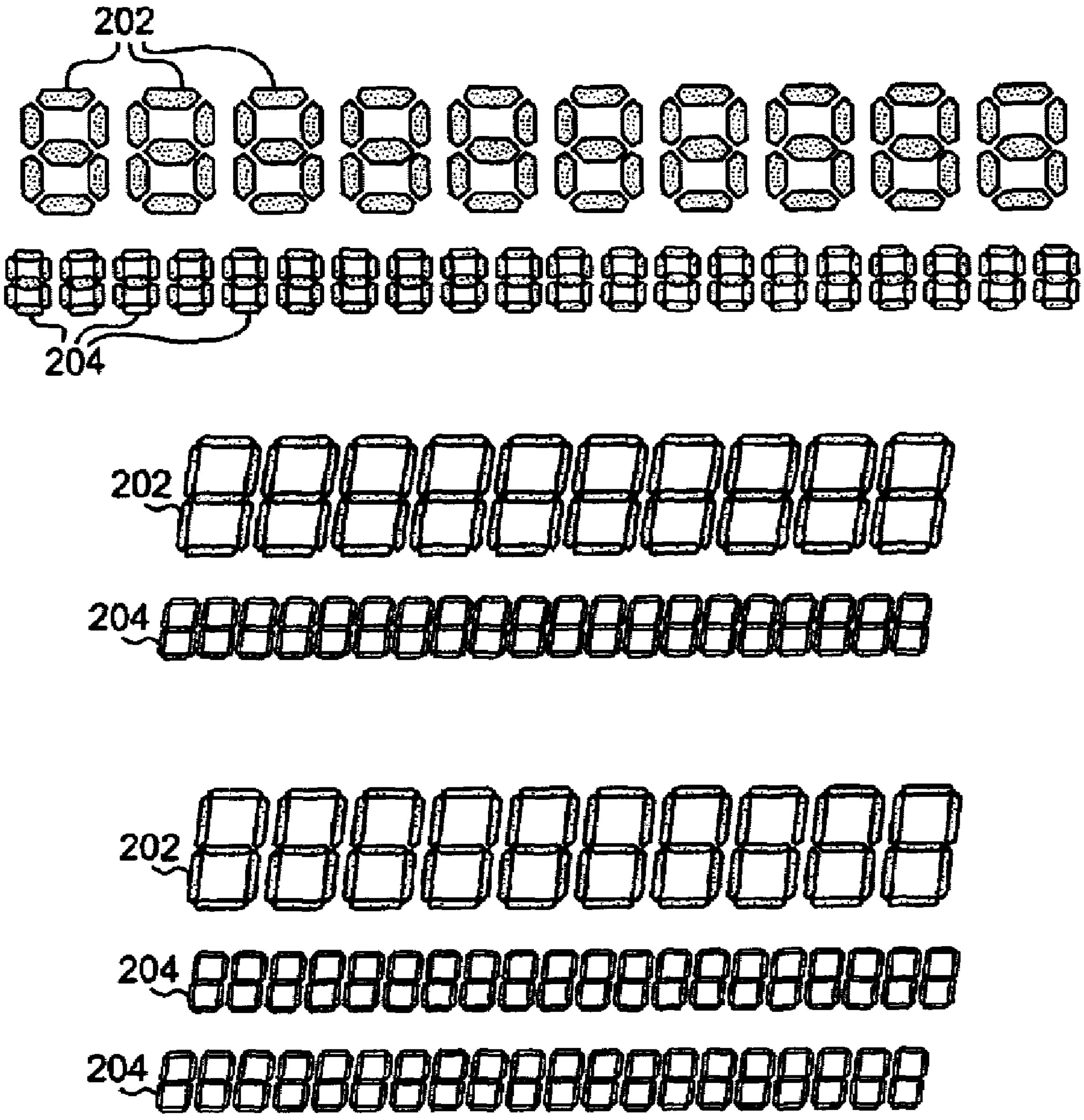
FIG. 11 is a representation of a character display configuration according to a further embodiment of the present invention.

FIG. 4 illustrates another embodiment of the present invention in which there is one row of large display characters 202, with a single large display character 202 and two identical rows of small display characters 204. FIG. 5 illustrates another embodiment of the present invention in which there is one row of large display characters 202, with five large display characters 202 and one row of ten small display characters 204. FIG. 6 illustrates another embodiment of the present invention in which there is one row of large display characters 202, with five large display characters 202 and two identical rows of ten small display characters 204. FIG. 7 illustrates another embodiment of the present invention in which there is one row of large display characters 202, with eight large display characters 202 and a single row of 16 small display characters 204. FIG. 8 illustrates another embodiment of the present invention in which there is one row of large display characters 202, with eight large display characters 202 and two identical rows of 16 small display characters 204. FIG. 9 illustrates another embodiment of the present invention in which there is one row of large display characters 202, with ten large display characters 202 and a single row of 20 small display characters 204. FIG. 10 illustrates another embodiment of the present invention in which there is one row of large display characters 202, with ten large display characters 202 and two identical rows of 20 small display characters 204. FIG. 11 illustrates other embodiments having one row of large display characters 202 and one or two rows of small display characters 204. The display characters 202, 204 in FIG. 11 are illustrated as seven-segment LED characters, and are also shown with the segments having different thicknesses.

It will be obvious to one with ordinary skill in the art that myriad arrangements are possible with varying numbers of rows of large display characters 202 and small display characters 204, or rows having characters of varying sizes, or having different numbers of characters displayed or capable of being displayed across the width of the display 16, or having characters capable of displaying other than alphanumeric text without departing from the spirit and scope of the invention. Preferred embodiments include displays with a single row of large display characters 202 for displaying alphanumeric text, such as the alphanumeric diagnostic code, and one or two rows of small display characters 204 for displaying alphanumeric textual descriptions associated with the diagnostic code.

The rows of characters 202, 204 are also capable of providing display of scrolling or streaming characters or displays, as disclosed in co-pending application Ser. No. 10/201,538 filed Jul. 23, 2002, and entitled "CODE READER DISPLAY," which is hereby incorporated by reference.

Figure 12:
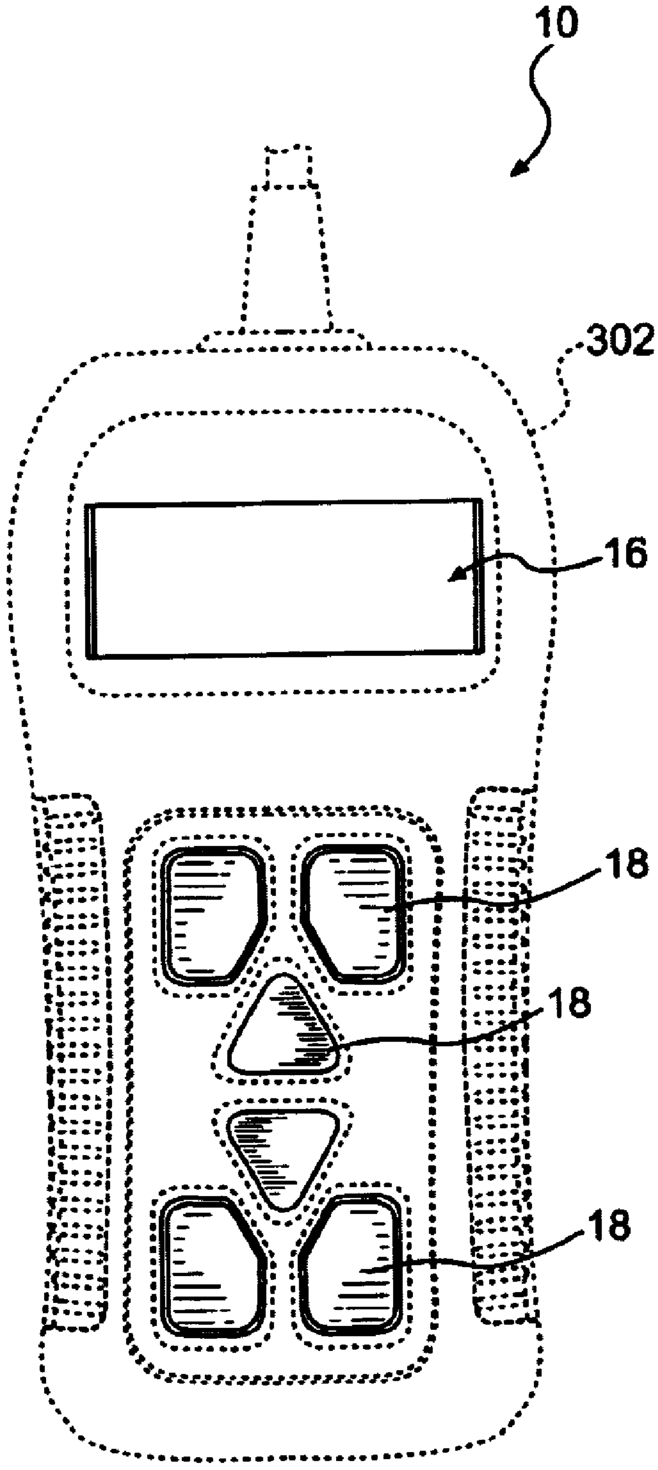
FIG. 12 is a plan view of one embodiment of the code reader according to the present invention.
Figure 13:
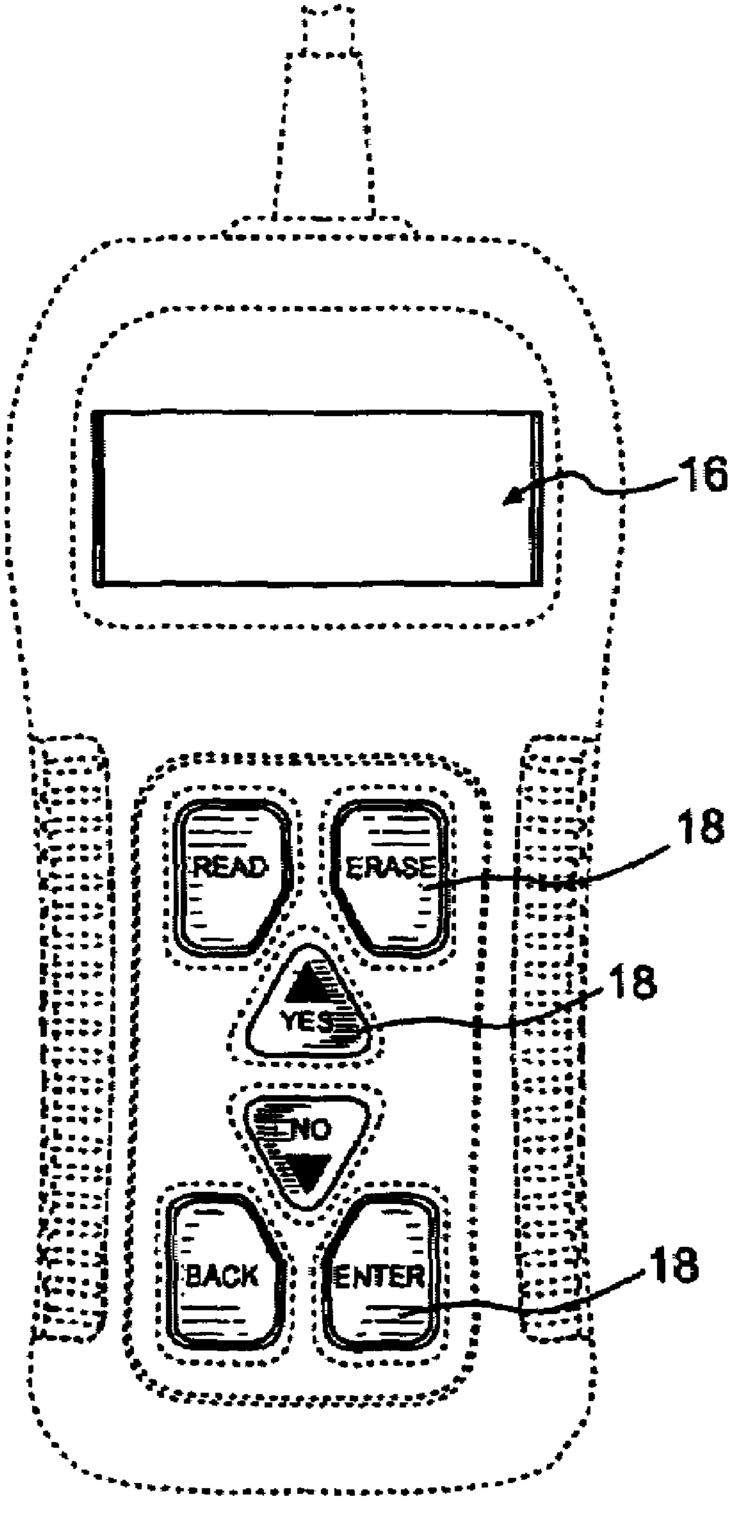
FIG. 13 is a plan view of another embodiment of the code reader according to the present invention.

The code reader 10 may be housed in a housing 302, such as that illustrated in FIG. 12. In a preferred embodiment, the housing 302 also contains the processor 12, the communications circuit 14, the display 16, and one or more input devices 18. In this embodiment, the input devices 18 are illustrated as buttons or keys located on a first surface of the housing 302. It is to be recognized that the input devices 18 need not be buttons or keys, but may be virtually any type of input device, including membrane switches, touch screens, etc. Further, the number of input devices 18 is determined based on the function ascribed to each input device 18 and the characteristics of the particular code reader 10 and the computer program(s) to be executed by the processor 12. In one embodiment, as illustrated in FIG. 12, there are six input devices 18. In a preferred embodiment, as illustrated in FIG. 13, there are six input devices 18, labeled as READ, ERASE, BACK, ENTER, YES/UP ARROW, and NO/DOWN ARROW.

As described above, the processor 12 executes a computer program to initialize the code reader and generate a user interface through which the user interacts and causes the code reader to communicate with the vehicle computer network 30. A preferred user interface is a menu-driven system displayed on the display 16 allowing the user to select different communication options via the input devices 18. An important feature of the present invention is the ability of the processor 12 to also generate a user interface to enable the code reader 10 to function as a simpler code reader, by allowing the user interact with the processor 12 by pressing the dedicated READ button to initiate communication with the vehicle computer, display any vehicle diagnostic codes that were stored in the modules in the vehicle diagnostic system in turn by pressing an ARROW button, and erasing the codes by pressing the ERASE button, as discussed above in reference to the ACTRON® CP9035 code reader. Pressing the READ button initiates the above sequence no matter what state the menu-driven interface is in. Similarly, pressing the ERASE button erases codes no matter what state the menu-driven interface is in. This is important for users who do not desire to utilize the menu-driven user interface or for those moments when the nested menu-driven interface is efficient, e.g., when the user is "lost" in the nested menus.

In one embodiment, the user interface for the simpler code reader function may be accessed by a first input device set having the same input devices 18 as used on the simpler code readers. For example, FIG. 13 illustrates the READ, UP ARROW/DOWN ARROW, and ERASE input devices 18 such as are found on the ACTRON® CP9035 code reader. These input devices 18 are the first input device set. FIG. 13 also illustrates additional input devices 18—BACK and ENTER—that may be used exclusively for advanced features of the present invention, such as the menu-driven user interface. The UP ARROW and DOWN ARROW input devices 18 also function as the YES and NO input devices for some features of the user interface. These input devices 18—READ, ERASE, YES, NO, BACK, and ENTER—make up a second input device set. As can be seen, the actual input devices 18 may be part of both the first input device set and the second input device set.

The first input device set may be operated with a user interface generated by the processor to function as a simpler code reader, such as the ACTRON® CP9035 code reader. The second input device set may be operated with a user interface generated by the processor 12 to function with improved features of the present invention, such as a menu-driven user interface, the display of textual descriptions of diagnostic codes, the scrolling or streaming of the textual information, etc. The code reader 10 of the present invention accommodates both the simpler code reader functions and user interface and improved code reader functions and user interface.

It is within the scope and spirit of the present invention to include several different user interfaces available for selection by the user depending on preference, particular code source, types of codes to be obtained, diagnoses to be performed, etc., and the invention is not to be limited to the selection and display of diagnostic codes related to OBD II codes or the ACTRON® CP9035 code reader or any other specific code readers or scan tools referenced herein.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art, for example, using fiber optic or wireless protocols. As another example, diagnostic codes other than OBD II codes may be obtained and displayed. Therefore, the invention in its broader aspects is not limited to the specific details, representative apparatus and methods, and illustrative examples shown and described. Accordingly, departures may be made from such details without departing from the spirit or scope of the applicant's general inventive concept.

What is claimed is:

1. A code reader for reading and displaying codes, comprising:

(a) a processor;

(b) a communications circuit in circuit communication with the processor, the communications circuit for generating a communications link with a source of a code; and (c) a display circuit in circuit communication with the processor, the display circuit having an available display region with a plurality of display characters arranged in a plurality of rows;

wherein the size of the display characters in a first row is larger than the size of the display characters in a row other than the first row, wherein the first row and the row other than the first row have substantially the same width as each other; and wherein the first row comprises a number N of display characters, and the row other than the first row comprises two times N of display characters.

2. The code reader of claim 1, wherein the communications circuit requests the code from the source and the code is stored in an internal or external memory.

3. The code reader of claim 2, wherein the processor causes the display to indicate that at least one code was stored.

4. The code reader of claim 1, further comprising at least one operator input device, wherein an operator may input instructions to the processor.

5. The code reader of claim 4, wherein the display region displays alphanumeric textual information corresponding to a code selected by the operator with the at least one operator input device.

6. The code reader of claim 5, wherein the alphanumeric textual information corresponding to the selected code is determined from a lookup table.

7. The code reader of claim 1, wherein the code comprises at least one alphanumeric character and the at least one alphanumeric character is displayed in the first row.

8. The code reader of claim 1, wherein the code corresponds to an alphanumeric textual description and the alphanumeric textual description is displayed in the display region in the rows other than the first row.

9. The code reader of claim 1, wherein the source of the code is a vehicle diagnostic system, and the communications circuit reads at least one code from the vehicle diagnostic system.

10. The code reader of claim 9, wherein the communications circuit is powered from the vehicle diagnostic system.

11. The code reader of claim 1, wherein the code has alphanumeric text associated therewith, the alphanumeric text for display in the rows other than the first row.

12. The code reader of claim 1, further comprising at least one operator input device.

13. The code reader of claim 12, wherein the at least one operator input device comprises a plurality of buttons for communication with the processor.

14. The code reader of claim 13, wherein the buttons are labeled as READ, ERASE, BACK, ENTER, YES/UP ARROW, and NO/DOWN ARROW.

15. The code reader of claim 12, wherein there are two sets of operator input devices.

16. The code reader of claim 15, wherein at least one operator input device is a member of each set of operator input devices.

17. The code reader of claim 1, wherein the first row or the row other than the first row or both are configured for displaying characters in such a way that the characters appear to be scrolling upwards.

18. The code reader of claim 1, wherein the first row or the row other than the first row or both are configured for displaying characters in such a way that the characters appear to be streaming from left to right.

19. The code reader of claim 1, wherein there is one row other than the first row.

20. The code reader of claim 1, wherein there are two rows other than the first row.

21. The code reader of claim 1, wherein the rows other than the first row comprise 16 display characters.

22. The code reader of claim 1, wherein the rows other than the first row comprise 20 display characters.

23. The code reader of claim 1, wherein the display characters of the first row each comprise a pixel matrix, so that the first row is made up of a plurality of first display characters each having a respective pixel matrix, and where in the characters of the other row are each made up of a plurality of second display characters each having a respective pixel matrix.

24. The code reader of claim 23, wherein each of the pixel matrixes is configured for displaying at least digits, characters, and other iconic graphical symbols.

25. A method for retrieving and displaying textual diagnostic information from a vehicle computer system comprising:

(a) establishing circuit communication between a code reader and the vehicle computer system;

(b) requesting data having at least one code from the vehicle computer system;

(c) retrieving the data;

(d) identifying a textual diagnosis description corresponding to a retrieved code selected by an operator; and (e) displaying the textual diagnosis description, utilizing a display circuit in circuit communication with a processor, the display circuit having an available display region with a plurality of display characters arranged in a plurality of rows;

wherein the size of the display characters in a first row is larger than the size of the display characters in a row other than the first row, wherein the first row and the row other than the first row have substantially the same width as each other; and wherein the first row comprises a number N of display characters, and the row other than the first row comprises two times N of display characters.

26. The method of claim 25, wherein the code selected by the operator is communicated to the code reader via at least one operator input device.

27. The method of claim 25, further comprising communicating a selected code from the operator to the code reader.

28. The method of claim 25, wherein identifying a textual diagnosis description corresponding to a retrieved code comprises reference to a lookup table.

29. A code reader for reading and displaying codes, comprising:

(a) means for establishing communication between the code reader and a source of a code;

(b) means for displaying alphanumeric textual information associated with a code, wherein the means for displaying comprises a display circuit in circuit communication with a processor, the display circuit having an available display region with a plurality of display characters arranged in a plurality of rows;

wherein the size of the display characters in a first row is larger than the size of the display characters in a row other than the first row, wherein the first row and the row other than the first row have substantially the same width as each other; and wherein the first row comprises a number N of display characters, and the row other than the first row comprises two times N of display characters.

30. The code reader of claim 29, wherein the means for displaying textual alphanumeric information comprises a display having a first row and at least one row other than the first row, the textual alphanumeric information being displayed in the at least one row other than the first row.

31. The code reader of claim 29, further comprising means for displaying the code.

32. The code reader of claim 29, further comprising means for an operator to communicate with the code reader to select the code for which textual alphanumeric information is to be displayed.

33. The code reader of claim 29, further comprising means to display a menu to the operator from which the operator may make selections to communicate with the code reader.

* * * * *